April 26, 1927.
C. B. BAILEY ET AL
GASKET
Filed Feb. 15, 1923
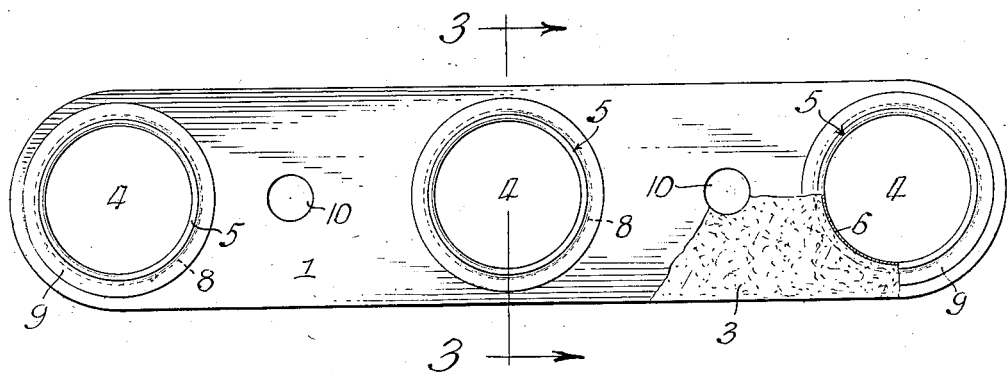
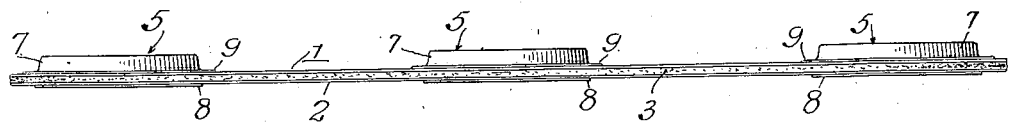
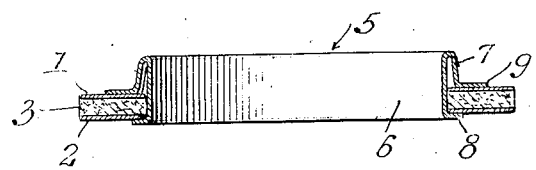
Inventors
Claude B. Bailey
William W. McCord
Charles Wilkins
by Eugen Cowan Atty.

Patented Apr. 26, 1927.

1,626,110

UNITED STATES PATENT OFFICE.

CLAUDE B. BAILEY, WILLIAM W. McCORD, AND CHARLES WILKINS, OF WYANDOTTE, MICHIGAN, ASSIGNORS, BY MESNE ASSIGNMENTS, TO McCORD RADIATOR & MFG. CO., OF DETROIT, MICHIGAN, A CORPORATION OF MAINE.

GASKET.

Application filed February 15, 1923. Serial No. 619,121.

This invention relates to gaskets for use with the manifolds of Ford engines, and consists in the matters hereinafter described and more particularly set forth in the appended claims.

In the accompanying drawings—

Fig. 1 is a front view of a gasket of our invention;

Fig. 2 is an edge view of the same; and

Fig. 3 is a cross-sectional view taken on line 3—3 of Fig. 1.

The gasket shown in the drawings comprises a body portion made of three overlapped flat layers of material, two outer layers 1, 2 of relatively thin sheet metal, such as copper, and an interposed layer of asbestos or other packing 3. These layers have the same size and shape and fit one against the other with their outer margins in register.

The gasket in the form shown in the drawings is made relatively narrow and has a length to extend between and over a number of aligned, closely spaced port holes (not shown) in the parts with which the gasket is used, as for instance the cylinder block of a Ford engine at the intake and exhaust ports and the applied manifolds. For this purpose the gasket has holes 4, 4 of the same size and arranged in a row spaced apart lengthwise of the gasket. The holes 4, 4 extend through the three layers 1 to 3 of the gasket body, as shown in Fig. 3.

The gasket is provided on one side with a plurality of tubular guide members 5, 5, one about each hole 4. These members project outward from the gasket body substantially the same distance and are designed to enter one set of port holes with which the gasket is used as the manifold pipes.

Said guide members 5 are made as shown in detail in Fig. 3. As there illustrated, the guide member is made up of inner and outer annular flanges 6, 7 joined along their outer edges and being made by folding or doubling the metal of said flanges on itself. The inside flange 6 extends through the associated hole 4 and covers the edges of the metal and asbestos layers 1 to 3 to protect them and close the layers 1 and 2 to the leakage of gas between them. The free margin of the inside flange 6 is bent outward to provide a base flange 8 overlapping the metal layer 2 on the outside, as shown.

The inside flange 6 projects outward beyond the other metal layer 1 and there joins the outside flange 7 in the folded edge between them. The outside flange 7 extends to the metal layer 1 and terminates in an annular marginal flange 9 bearing against the metal layer 1 about the outside of the flange 7, as shown. The marginal flanges 8 and 9 serve to clamp together the layers 1 to 3 about the registering holes 4 therein.

This double flange construction for each guide member 5 reinforces the same against both inward and outward bending during handling and on striking against the edges of port holes when inserting the same therein. The outside flanges 7 are tapered outward to accommodate themselves to the port holes into which they are inserted and also to give resiliency to more readily grip in the openings and hold the gasket from accidentally falling out.

Between the holes 4, the gasket is provided with holes 10 to receive the screw threaded rods or studs fixed to the cylinder block and extending outward therefrom at the manifold ports, as in a Ford engine. These studs serve as guides for the gasket in its application to the cylinder block and also support the same at the cylinder ports.

By making the gasket in strips of a length to take in all the port holes for which it is designed, together with guide members for each port hole, only one gasket is needed for all of such holes instead of a separate gasket for each port hole, as heretofore, with the attendant advantage of having a number of gaskets in one. The side of the gasket body opposite the guides 5, 5 is substantially flat and free of projections so as not to offer any hindrance to the gasket being clamped against the cylinder block.

While we have shown and described herein in detail a gasket constructed in accordance with our invention, it is of course to be understood that the details of construction and arrangement of parts may be variously changed and modified without departing from the spirit and scope of our invention.

We claim as our invention:

1. A manifold gasket having a relatively flat and laterally narrow body portion having a row of port and stud holes therein spaced apart lengthwise of the gasket body with the stud holes smaller than the port holes and between them, and tubular guide members carried by the gasket body about the port holes and projecting outward therefrom to one side of the gasket body, the other side of the latter being substantially flat and free of projections.

2. A gasket, comprising a body portion of outer layers of sheet metal and an interposed layer of asbestos or like material, said layers having a row of registering port holes therein spaced apart lengthwise of the gasket, tubular guide members formed from sheet metal and carried by the gasket body about said holes, said guide members projecting outward from the gasket body to one side thereof and having double flanges for reinforcement against bending.

3. A gasket, comprising a relatively flat and laterally narrow body portion of outer layers of sheet metal and an interposed layer of asbestos or like material, said layers having a row of registering holes spaced apart lengthwise of the gasket, and tubular guide members formed from sheet metal and carried by the gasket body about said holes, said guide members projecting outward to one side of the gasket body.

4. A gasket, comprising a relatively flat and laterally narrow body portion of outer layers of sheet metal and an interposed layer of asbestos or like material, said layers having a row of registering holes spaced apart lengthwise of the gasket, and tubular guide members made from separate pieces of sheet metal, said guide members having inner and outer annular flanges projecting outward from one side of the gasket body with the inner flanges extending through said holes, said annular flanges having outwardly extending base flanges about said holes and terminating short of the adjacent edges of the gasket body with the base flanges overlapping the outer metal layers on the outside.

5. A gasket, comprising a relatively flat and laterally narrow body portion of outer layers of sheet metal and an interposed layer of asbestos or like material, said layers having a row of registering holes spaced apart lengthwise of the gasket, and tubular guide members carried by the gasket body about said holes and projecting outward from one side of the gasket, said guide members being formed from separate pieces of sheet metal folded to provide inner and outer annular flanges with the fold between them forming the outer edges of the guide members, said inner flanges extending through the holes in the gasket and covering the edges of the gasket layers about the holes, said annular flanges having base flanges terminating short of the adjacent edges of the gasket body and overlapping the outer metal layers about said holes.

6. A manifold gasket, comprising a flat and laterally narrow body portion made of outer layers of sheet metal and an interposed layer of asbestos or like material, said layers having a row of port and stud holes therein spaced apart lengthwise of the gasket with the stud holes smaller than the port holes and between them, and tubular guide members of sheet metal carried by the gasket body about the port holes and projecting outward therefrom.

7. A manifold gasket, comprising a flat and laterally narrow body portion made of outer layers of sheet metal and an interposed layer of asbestos or like material, said layers having a row of port and stud holes therein spaced apart lengthwise of the gasket with the stud holes smaller than the port holes and between them, and tubular guide members of sheet metal carried by the gasket body about the port holes and projecting outward therefrom, said guide members having inner and outer annular flanges projecting outward from the gasket body with the inner flanges extending through the port holes.

8. A manifold gasket, comprising a flat and laterally narrow body portion made of outer layers of sheet metal and an interposed layer of asbestos or like material, said layers having a row of port and stud holes therein spaced apart lengthwise of the gasket with the stud holes smaller than the port holes and between them, and tubular guide members of sheet metal about the port holes and projecting outward therefrom, said guide members being formed independently of the gasket body and folded to provide inner and outer annular flanges with the fold between them forming the outer edges of the guide members, said flanges having base flanges overlapping the outer metal layers about the port holes and with the inner flanges extending through the same.

In testimony that we claim the foregoing as our invention, we affix our signatures this 7th day of February, A. D. 1923.

CLAUDE B. BAILEY.
WILLIAM W. McCORD.
CHARLES WILKINS.